(12) United States Patent
Hosoya et al.

(10) Patent No.: US 11,667,767 B2
(45) Date of Patent: Jun. 6, 2023

(54) CLADDING COMPOSITION, AND METHOD FOR PRODUCING METAL/RESIN BONDED MEMBER

(71) Applicants: TOKYO OHKA KOGYO CO., LTD., Kanagawa (JP); Kisoh Co., Ltd., Nagoya (JP)

(72) Inventors: Mamoru Hosoya, Kawasaki (JP); Takeshi Iwai, Kawasaki (JP); Takashi Fujimoto, Kawasaki (JP); Tomohiro Maeda, Kasugai (JP)

(73) Assignees: TOKYO OHKA KOGYO CO., LTD., Kanagawa (JP); KISOH CO., LTD., Aichi (JP)

( * ) Notice: Subject to any disclaimer, the term of this patent is extended or adjusted under 35 U.S.C. 154(b) by 8 days.

(21) Appl. No.: 17/045,302

(22) PCT Filed: Apr. 3, 2019

(86) PCT No.: PCT/JP2019/014797
§ 371 (c)(1),
(2) Date: Oct. 5, 2020

(87) PCT Pub. No.: WO2019/198591
PCT Pub. Date: Oct. 17, 2019

(65) Prior Publication Data
US 2021/0147652 A1    May 20, 2021

(30) Foreign Application Priority Data
Apr. 13, 2018    (JP) .............................. JP2018-077976

(51) Int. Cl.
*C08K 3/08*        (2006.01)
*B29C 65/16*        (2006.01)
*B29C 65/00*        (2006.01)

(52) U.S. Cl.
CPC ............ *C08K 3/08* (2013.01); *B29C 65/1683* (2013.01); *B29C 66/742* (2013.01); *C08K 2003/0812* (2013.01); *C08K 2003/0881* (2013.01)

(58) Field of Classification Search
CPC .............. B29C 66/742; B29C 66/7422; B29C 66/7428; C08K 3/08; B23K 26/34; B23K 35/35
See application file for complete search history.

(56) References Cited

U.S. PATENT DOCUMENTS

| | | | |
|---|---|---|---|
| 2004/0234695 A1* | 11/2004 | Trahan .................... | C23C 18/42 427/372.2 |
| 2007/0138157 A1 | 6/2007 | Dane et al. | |
| 2014/0287165 A1* | 9/2014 | Cavanaugh ............. | C23C 26/02 106/1.19 |
| 2016/0271696 A1 | 9/2016 | Kamakura | |
| 2017/0129012 A1 | 5/2017 | Ishida et al. | |
| 2017/0326812 A1 | 11/2017 | Arai et al. | |

FOREIGN PATENT DOCUMENTS

| | | | | |
|---|---|---|---|---|
| CN | 104846368 A | * | 8/2015 | |
| CN | 104962909 | | 10/2015 | |
| CN | 104968483 | | 10/2015 | |
| CN | 106676520 A | * | 5/2017 | ........... C23C 24/103 |
| CN | 106794636 | | 5/2017 | |
| EP | 3 064 556 | | 9/2016 | |
| GB | 1163766 A | * | 9/1969 | ............... B22F 7/04 |
| JP | 9-82133 | | 3/1997 | |
| JP | 2013-83003 | | 5/2013 | |
| JP | 2016-130003 | | 7/2016 | |
| JP | 5953559 | | 7/2016 | |
| JP | 2016-175389 | | 10/2016 | |
| JP | 2017-87244 | | 5/2017 | |
| JP | 2017-190521 | | 10/2017 | |
| WO | 2017/161099 | | 9/2017 | |

OTHER PUBLICATIONS

Machine translation of CN 106676520 (2017, 8 pages).*
Machine translation of CN 104846368 (2015, 6 pages).*
Lacquers (Oil and Colour Chemists' Association. 1984. Conversion Coatings. In: Surface Coatings. Springer, Dordrecht. https://doi.org/10.1007/978-94-010-9810-6 11, pp. 558-577).*
Office Action dated Dec. 2, 2021, in Chinese Patent Application No. 201980024859.7.
Extended European Search Report dated May 23, 2022 in corresponding European Patent Application No. 19785508.3.
International Search Report dated Jun. 18, 2019 in International (PCT) Application No. PCT/JP2019/014797.

* cited by examiner

*Primary Examiner* — Brieann R Johnston
(74) *Attorney, Agent, or Firm* — Wenderoth, Lind & Ponack, L.L.P.

(57) ABSTRACT

Provided is a cladding composition which contains metal powder, a binder, and an organic solvent in a case of bonding a metal base material and a resin member to each other. Further, provided is a method for producing a metal/resin bonded member, including a step of coating at least a portion of a metal base material with the cladding composition; a step of irradiating the coated portion of the metal base material which has been coated with the cladding composition, with a laser; a step of disposing the resin member on the laser irradiation portion of the metal base material; and a step of heating an interface between the laser irradiation portion and the resin member so that the metal base material and the resin member are bonded to each other.

12 Claims, 2 Drawing Sheets

US 11,667,767 B2

CLADDING COMPOSITION, AND METHOD FOR PRODUCING METAL/RESIN BONDED MEMBER

TECHNICAL FIELD

The present invention relates to a cladding composition and a method for producing a metal/resin bonded member. Priority is claimed on Japanese Patent Application No. 2018-077976, filed Apr. 13, 2018, the content of which is incorporated herein by reference.

BACKGROUND ART

In recent years, from the viewpoint of environmental load, reduction of carbon dioxide ($CO_2$) emission in vehicles has been naturally required.

Meanwhile, hybrid vehicles and electric vehicles that consume less gasoline as fuel are produced. Further, in order to reduce fuel consumption, attention has been paid to weight reduction of a vehicle body, and studies have been made to apply a new lighter and stronger material to the vehicle body.

Examples of the new material include those obtained by bonding different kinds of materials.

Adhesives are commonly used in a case of bonding different kinds of materials. However, the use of the adhesives causes problems in terms of a large environmental load, deterioration of the adhesives with time, and the bonding strength.

As a technique for solving such problems, a method of bonding different kinds of materials without using an adhesive has been suggested.

For example, Patent Literature 1 discloses a bonding method of bonding a metal base material and a resin member to each other by adhering metal powder to one surface of the metal base material, irradiating the surface with a laser to form a superimposed fine particle structure alloyed with the metal base material, pressing the resin member against the superimposed fine particle structure, and irradiating the interface therebetween with a laser so that the interface is heated.

CITATION LIST

Patent Literature

[Patent Literature 1]
Japanese Patent Application No. 5953559

SUMMARY OF INVENTION

Technical Problem

However, in the bonding method described in Patent Literature 1, since the metal base material is coated with a powder metal, it is difficult to stably bond the metal base material and the resin member to each other in a case where the metal base material is disposed on an inclined surface. Further, there is also a problem in that it is difficult to bond a metal base material and a resin member to each other in an environment that is not suitable for use of powder in the related art, such as an environment in which the place where bonding is performed vibrates.

The present invention has been made in consideration of the above-described circumstances, and an object thereof is to provide a method for producing a metal/resin bonded member in which the bonding strength between a metal base material and a resin member is further increased without using an adhesive, and a cladding composition, which is capable of stably bonding a metal base material and a resin member to each other.

Solution to Problem

In order to solve the above-described problems, the present invention has adopted the following configurations.

That is, according to a first aspect of the present invention, there is provided a cladding composition, including: metal powder; a binder; and an organic solvent.

According to a second aspect of the present invention, there is provided a method for producing a metal/resin bonded member in which a metal base material and a resin member are bonded to each other, the method including: a step of coating at least a portion of the metal base material with the cladding composition according to the first aspect of the present invention; a step of irradiating the coated portion of the metal base material which has been coated with the cladding composition, with a laser; a step of disposing the resin member on the laser irradiation portion of the metal base material; and a step of heating an interface between the laser irradiation portion and the resin member so that the metal base material and the resin member are bonded to each other.

Advantageous Effects of Invention

According to the method for producing a metal/resin bonded member of the present invention, it is possible to produce a metal/resin bonded member in which the bonding strength between the metal base material and the resin member is further increased without using an adhesive.

Further, according to the cladding composition of the present invention, it is possible to stably bond the metal base material and the resin member to each other.

DESCRIPTION OF EMBODIMENTS (Cladding Composition)

Figure 1:
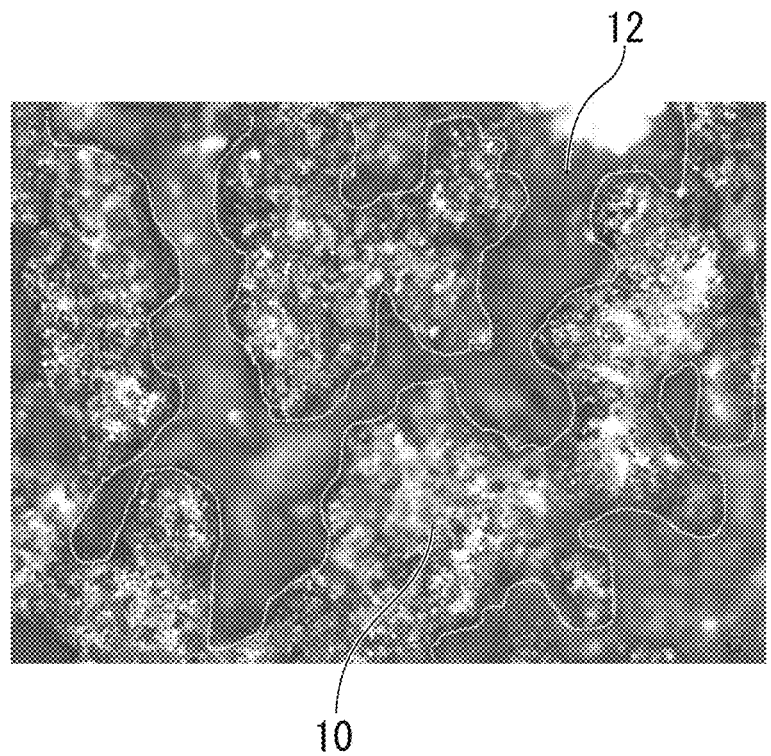
FIG. 1 is an optical microscope image (at a magnification of 5 times) showing a state of beads formed using a cladding composition of Example 4.

A cladding composition according to the present embodiment contains metal powder, a binder, and an organic solvent.

The "cladding composition" in the present invention indicates a material that is melted and solidified on a surface of a metal base material serving as a base material to form beads (protrusions of an alloy).

<Metal Powder>

Examples of the metal constituting the metal powder in the present embodiment include aluminum, nickel, chromium, iron, copper, titanium, silicon, stellite, vanadium, and alloys of a plurality of these.

The metal powder may be used alone or in combination of two or more kinds thereof. By combining two or more metals, a porous structure can be easily formed on the surface of a bead and, for example, the bonding strength between the metal base material and the resin member can be easily increased.

It is preferable that the metal powder contains titanium, and suitable examples thereof include those containing titanium and aluminum.

The average particle diameter of the metal powder is, for example, in a range of 10 μm to 100 μm.

The "average particle diameter of the powder" in the present invention indicates a value of the volume average particle diameter of the powder measured by a known particle size distribution measuring device.

The content of the metal powder is preferably in a range of 25% to 70% by mass, more preferably in a range of 30% to 65% by mass, still more preferably in a range of 40% to 60% by mass, and particularly preferably in a range of 50% to 60% by mass with respect to the total amount (100% by mass) of the cladding composition.

In a case where the content of the metal powder is greater than or equal to the lower limit of the above-described preferable range, the bonding strength between the metal base material and the resin member is more likely to be increased. Further, in a case where the content thereof is less than or equal to the upper limit of the above-described preferable range, the composition is easily handled.

<Binder>

The binder according to the present embodiment functions as a dispersant for the metal powder or as a viscosity modifier in the cladding composition.

An organic compound or inorganic compound can be used as the binder.

Examples of the organic compound in the binder include a cellulose compound, polyacrylic acid and other acrylic compounds, polyvinyl acetal, polyvinyl alcohol, and an epoxy compound.

Specific examples of the cellulose compound include hydroxypropyl cellulose and hydroxyethyl cellulose.

Examples of the inorganic compound in the binder include clay minerals. Specific examples of the clay minerals include bentonite, smectite, and montmorillonite.

The binder may be used alone or in combination of two or more kinds thereof.

As the binder, an organic compound is preferable. Among the examples thereof, those containing a cellulose compound are more preferable from the viewpoint of easily adjusting the viscosity of the composition. Hydroxypropyl cellulose is preferable as the cellulose compound.

Among examples of the hydroxypropyl cellulose, for example, from the viewpoint of easily increasing the bonding strength between the metal base material and the resin member, hydroxypropyl cellulose having a mass average molecular weight (Mw) of 100000 to 800000 is preferable, hydroxypropyl cellulose having a Mw of 110000 to 700000 is more preferable, and hydroxypropyl cellulose having a Mw of 120000 to 650000 is still more preferable.

Further, from the viewpoints of strong adhesiveness to a metal and excellent dispersibility with metal powder, a binder containing polyvinyl acetal is preferable as the binder. Among examples thereof, a binder containing polyvinyl butyral is particularly preferable. Among examples of polyvinyl butyral, for example, from the viewpoint of easily increasing the bonding strength between the metal base material and the resin member, polyvinyl butyral having a Mw of 10000 to 80000 is preferable, polyvinyl butyral having a Mw of 30000 to 80000 is more preferable, and polyvinyl butyral having a Mw of 50000 to 70000 is still more preferable.

The content of the binder is preferably in a range of 0.000001% to 10% by mass and more preferably in a range of 0.00001% to 5% by mass with respect to the total amount (100% by mass) of the cladding composition.

In a case of using hydroxypropyl cellulose as the binder, the content of hydroxypropyl cellulose is preferably in a range of 0.00001% to 5% by mass, more preferably in a range of 0.0001% to 2% by mass, and particularly preferably in a range of 0.001% to 2% by mass with respect to the total amount (100% by mass) of the cladding composition.

In a case of using polyvinyl butyral as the binder, the content of polyvinyl butyral is preferably in a range of 0.1% to 10% by mass, more preferably in a range of 0.2% to 7% by mass, and particularly preferably in a range of 0.5% to 5% by mass with respect to the total amount (100% by mass) of the cladding composition.

In a case where the content of the binder is greater than or equal to the lower limit of the above-described preferable range, the bonding strength between the metal base material and the resin member is more likely to be increased, and the property of coating the metal base material with the composition is further improved. Meanwhile, in a case where the content thereof is less than or equal to the upper limit of the above-described preferable range, the composition is easily handled.

<Organic Solvent>

Examples of the organic solvent in the present embodiment include those that serve as a dispersion medium for the metal powder and the binder.

Specific examples of such organic solvents include alcohol having a chain structure such as methanol, ethanol, n-propyl alcohol, isopropyl alcohol, n-pentyl alcohol, s-pentyl alcohol, t-pentyl alcohol, isopentyl alcohol, 2-methyl-1-propanol, 2-ethyl butanol, neopentyl alcohol, n-butanol, s-butanol, t-butanol, n-hexanol, 2-heptanol, 3-heptanol, 2-methyl-1-butanol, 2-methyl-2-butanol, 4-methyl-2-pentanol, 1-butoxy-2-propanol, propylene glycol monopropyl ether, 5-methyl-1-hexanol, 6-methyl-2-heptanol, 1-octanol, 2-octanol, 3-octanol, 4-octanol, 2-ethyl-1-hexanol, or 2-(2-butoxyethoxy)ethanol; alcohol having a cyclic structure such as cyclopentanemethanol, 1-cyclopentylethanol, cyclohexanol, cyclohexanemethanol, cyclohexaneethanol, 1,2,3,6-tetrahydrobenzyl alcohol, exo-norborneol, 2-methylcyclohexanol, cycloheptanol, 3,5-dimethylcyclohexanol, benzyl alcohol, or terpionel; lactones such as γ-butyrolactone; ketones such as acetone, methyl ethyl ketone, cyclohexanone, methyl-n-pentyl ketone, methyl isopentyl ketone, and 2-heptanone; polyhydric alcohol such as ethylene glycol, diethylene glycol, propylene glycol, dipropylene glycol, or glycerin; derivatives of polyhydric alcohols such as compounds having an ether bond such as monophenyl ether or monoalkyl ether such as monomethyl ether, monoethyl ether, monopropyl ether, or monobutyl ether of compounds having an ester bond such as ethylene glycol monoacetate, diethylene glycol monoacetate, propylene glycol monoacetate, or dipropylene glycol monoacetate and compounds having the polyhydric alcohols or the ester bond [among these, propylene glycol monomethyl ether acetate (PGMEA) or propylene glycol monomethyl ether (PGME) is preferable]; cyclic ethers such as dioxane; esters such as methyl lactate, ethyl lactate (EL), methyl acetate, ethyl acetate, butyl acetate, methyl pyruvate, ethyl pyruvate, methyl methoxypropionate, and ethyl ethoxypropionate; an aromatic organic solvent such as anisole, ethyl benzyl ether, cresyl methyl ether, diphenyl ether, dibenzyl ether, phenetol, butyl phenyl ether, ethylbenzene, diethylbenzene, pentylbenzene, isopropylbenzene, toluene, xylene, cymene, or mesitylene, and dimethyl sulfoxide (DMSO).

The organic solvent may be used alone or in combination of two or more kinds thereof.

It is preferable that the organic solvent contains alcohol. As the alcohol, alcohol having a chain structure described above or a polyhydric alcohol is preferable, and specific examples thereof include ethanol and glycerin.

Further, as the organic solvent, an organic solvent containing a derivative of polyhydric alcohols is preferable. Specific examples of the derivative of polyhydric alcohols include PGMEA and PGME.

The content of the organic solvent is preferably in a range of 25% to 70% by mass, more preferably in a range of 30% to 60% by mass, and still more preferably in a range of 35% to 50% by mass with respect to the total amount (100% by mass) of the cladding composition.

<Other Components>

The cladding composition according to the present embodiment may further contain components other than the metal powder, the binder, and the organic solvent described above.

Examples of other components include carbon powder and surfactants.

It is preferable that the cladding composition according to the present embodiment further contains carbon powder. In a case where the composition further contains carbon powder, the composition is melted and solidified on the surface of the metal base material which is a base material so that beads are easily formed.

The average particle diameter of the carbon powder is, for example, in a range of 10 nm to 100 μm.

The content of the carbon powder is preferably in a range of 0.1% to 15% by mass, more preferably in a range of 0.5% to 10% by mass, and still more preferably in a range of 1% to 8% by mass with respect to the total amount (100% by mass) of the cladding composition.

In a case where the content of the carbon powder is greater than or equal to the lower limit of the above-described preferable range, for example, the bonding strength between the metal base material and the resin member is more likely to be increased. Further, in a case where the content thereof is less than or equal to the upper limit of the above-described preferable range, the fluidity of the composition is improved.

In the cladding composition according to the present embodiment, the mixing ratio (mass ratio) of the metal powder to the carbon powder (metal powder/carbon powder) is preferably in a range of 3 to 30, more preferably in a range of 4 to 20, and still more preferably in a range of 5 to 15.

In a case where the mixing ratio (mass ratio) therebetween is greater than or equal to the lower limit of the above-described preferable range, for example, the bonding strength between the metal base material and the resin member is more likely to be increased. Further, in a case where the mixing ratio therebetween is less than or equal to the upper limit of the above-described preferable range, the fluidity of the composition is improved.

Method for producing cladding composition:

The cladding composition according to the present embodiment can be produced by a production method including, for example, a step of preparing a mixed solution of a binder and an organic solvent and a step of mixing the mixed solution and metal powder.

The concentration of the binder in the mixed solution of the binder and the organic solvent is preferably in a range of 0.00001% to 10% by mass, more preferably in a range of 0.0001% to 5% by mass, and still more preferably in a range of 0.001% to 1% by mass with respect to the concentration of the mixed solution (100% by mass).

In a case where the concentration of the binder is greater than or equal to the lower limit of the above-described preferable range, the property of coating the metal base material with the composition is further improved. Further, in a case where the concentration of the binder is less than or equal to the upper limit of the above-described preferable range, the viscosity of the composition is likely to be appropriately adjusted.

The mixing ratio (mass ratio) of the mixed solution to the metal powder (mixed solution/metal powder) is, for example, in a range of 3/7 to 5/5.

In a case of mixing the mixed solution with the metal powder, mixed powder obtained by mixing the metal powder with the carbon powder in advance may be blended therein.

In the cladding composition according to the embodiment described above, it is preferable that the metal powder is dispersed in a mixed solution of the binder and the organic solvent.

The cladding composition according to the embodiment may be in the form of a paste, a slurry, a suspension, or the like. Among these, a paste is preferable.

The "paste" here is set as a substance which is in a state of having fluidity and high viscosity and has a viscosity of 1000 cps (1 Pa·s) to 200000 cps (200 Pa·s). The viscosity of the paste indicates a value measured at 25° C. using an E-type viscometer.

(Method for Producing Metal/Resin Bonded Member)

A production method according to a first embodiment is a method for producing a metal/resin bonded member in which a metal base material and a resin member are bonded to each other, and the method includes a step (hereinafter, also referred to as a "step (i)") of coating at least a portion of the metal base material with the cladding composition; a step (hereinafter, also referred to as a "step (ii)") of irradiating the coated portion of the metal base material which has been coated with the cladding composition, with a laser; a step (hereinafter, also referred to as a "step (iii)") of disposing the resin member on the laser irradiation portion of the metal base material; and a step (hereinafter, also referred to as a "step (iv)") of heating an interface between the laser irradiation portion and the resin member so that the metal base material and the resin member are bonded to each other.

In the present embodiment, examples of the metal base material serving as a base material include an aluminum alloy, aluminum die-cast, stainless steel, and cold rolled steel plate (SPCC).

In the present embodiment, examples of the resin member include polyamide (nylon 6, nylon 6,6, or the like), polycarbonate, polypropylene, and polyphenylene sulfide.

[Step (i)]

In the step (i), at least a portion of the metal base material is coated with the cladding composition described above.

The method of coating the portion with the cladding composition is not particularly limited, and examples thereof include a screen coating method, a coating method using a dispenser, and a method performing coating by spraying.

The thickness of the coating film of the cladding composition applied to the metal base material may be appropriately set according to the blending components of the composition and is, for example, in a range of 50 to 200 μm.

[Step (ii)]

In the step (ii), the coated portion of the metal base material which has been coated with the cladding composition is irradiated with a laser.

As the laser to be applied to the coated portion, any laser that can heat the metal powder may be used, and examples thereof include a semiconductor laser, a fiber laser, an Nd:YAG laser, and a carbon dioxide gas laser.

The metal powder is melted by irradiating the coated portion with a laser. The metal in this melted state is alloyed with the metal base material so that beads (protrusions of the alloy, so-called built-up portions) are formed on the surface of the metal base material. Further, the binder and the like are irradiated with a laser so as to be heated, and thus are burned up.

From the viewpoint of the bonding strength between the metal base material and the resin member, the size of the bead (the height thereof with respect to the surface of the metal base material) is preferably in a range of 1 μm to 200 μm. Further, the bead has a superimposed fine particle structure.

In the present invention, the "superimposed fine particle structure" indicates a fine structure in which a structure having a fine uneven shape is further superimposed on a surface having a fine uneven shape. In a case where beads having a superimposed fine particle structure are formed on the surface of the metal base material, an anchor effect is exhibited.

Further, the concept of the superimposed fine particle structure includes a structure in a case where an alloy layer formed of any of a eutectic crystal, a solid solution, and an intermetallic compound is formed.

[Step (iii)]

In the step (iii), the resin member is disposed on the laser irradiation portion of the metal base material.

Examples of the method of disposing the resin member on the laser irradiation portion include a method of coating the laser irradiation portion with the resin composition which is the material of the resin member to form a film and a method of disposing a molded body of the resin composition on the laser irradiation portion.

Further, in a case of disposing the resin member on the laser irradiation portion, it is preferable that the resin member is brought into contact with and pressed against the metal base material.

The degree of the pressure in a case of pressing the resin member against the metal base material is typically set by selecting the optimum conditions in a pressure range of 0.1 to 3 MPa. As a result, the bonding strength therebetween is sufficiently increased.

[Step (iv)]

In the step (iv), the interface between the laser irradiation portion and the resin member is heated to bond the metal base material and the resin member to each other, thereby obtaining a metal/resin bonded member.

The method of heating the interface is not particularly limited, and examples thereof include heating the interface using a heater and heating the interface by irradiation with a laser.

The bead having a superimposed fine particle structure which has been formed on the surface of the metal base material is not transparent to the wavelength of the laser. Therefore, in a case of heating the interface by irradiation with a laser, the laser applied to the surface of the bead is converted into heat. The converted heat is propagated to the surface of the resin member which has come into contact with and has been pressed against the metal base material and allows the resin member to be melted. The melted resin member permeates into the superimposed fine particle structure. As a result, the metal base material and the resin member are firmly bonded to each other.

Further, in the case of heating the interface by irradiation with a laser, a method of irradiating the interface with a laser from a side of the resin member is typically performed. However, in a case where the resin member does not transmit a laser and the other metal base material absorbs the laser, the interface between the metal base material and the resin member can be heated by irradiating the interface with the laser from a side of the metal base material using metal heat transfer, contrary to a typical case.

In the production method according to the first embodiment described above, beads having a superimposed fine particle structure are formed on the surface of the metal base material using the cladding composition which contains the metal powder and the binder. Therefore, according to the production method according to the first embodiment, it is possible to produce a metal/resin bonded member in which the bonding strength between the metal base material and the resin member is further increased without using an adhesive.

The bonding strength of the metal/resin bonded member produced by the production method according to the first embodiment is, for example, in a range of 35 to 50 MPa.

Further, since the cladding composition that has been employed exhibits an appropriate level of viscosity in a case of containing a binder and an organic solvent together the metal powder, a site to be bonded can be reliably coated with the composition even in a case where the metal base material is disposed on the inclined surface.

Further, the site to be bonded can be coated with a smaller amount of the cladding composition that has been employed than the amount of the metal powder in a state in which the metal is more uniformly disposed. For this reason, the utilization efficiency of the cladding composition is increased particularly in a case of the irradiation with a laser.

Further, the cladding composition which has been employed can be uniformly applied even in a case where the size of the metal base material is larger than the size of the metal powder. Therefore, the composition is useful for bonding members having a large size.

Since the cladding composition which has been employed contains a binder together with the metal powder, the powder is distributed with a moderate density, and largely uneven beads are likely to be formed. Therefore, the bonding strength can be further increased, and the metal base material and the resin member can be stably bonded to each other.

Other Embodiments

The cladding composition and the method for producing the metal/resin bonded member according to the present invention are not limited to the embodiments described above. For example, in the production method according to the first embodiment, it is preferable to use mixed metal powder of one or more metals that are the same as the metals constituting the metal base material and a metal other than the metals, as the metal powder used in the cladding composition. By applying the cladding composition which contains such mixed metal powder, the compatibility between the metal powder and the metal base material is enhanced. Accordingly, beads which are distributed with an appropriate density are likely to be formed on the surface of the metal base material. In this manner, the metal base material and the resin member can be bonded more firmly and stably.

According to the production method of the embodiments described above, the metal base material and the resin member can be bonded more firmly without using an adhesive. Therefore, the production method to which the present invention is applied is useful as a method for producing a new material that realizes weight reduction of a vehicle body.

EXAMPLES

Hereinafter, the present invention will be described in more detail with reference to examples, but the present invention is not limited to these examples.

Preparation of Cladding Composition

Examples 1 to 24 and Comparative Examples 1 to 11

The components listed in Tables 1 to 6 were mixed to prepare a cladding composition of each example. The form of the cladding composition of each example is also listed in the tables.

TABLE 1

| | Metal powder | | Binder | Organic solvent | Carbon powder | Form of composition |
|---|---|---|---|---|---|---|
| Comparative Example 1 | (M)-1 [17] | (M)-2 [10] | — | (S)-1 [70] | (C)-1 [3] | Paste |
| Comparative Example 2 | (M)-1 [23] | (M)-2 [14] | — | (S)-1 [60] | (C)-1 [3] | Paste |
| Comparative Example 3 | (M)-1 [29] | (M)-2 [17] | — | (S)-1 [50] | (C)-1 [4] | Paste |
| Comparative Example 4 | (M)-1 [34] | (M)-2 [20] | — | (S)-1 [40] | (C)-1 [6] | Paste |
| Comparative Example 5 | (M)-1 [40] | (M)-2 [24] | — | (S)-1 [30] | (C)-1 [6] | Kneaded material |
| Comparative Example 6 | (M)-1 [17] | (M)-2 [10] | — | (S)-2 [70] | (C)-1 [3] | Dispersion liquid |
| Comparative Example 7 | (M)-1 [23] | (M)-2 [14] | — | (S)-2 [60] | (C)-1 [3] | Slurry |

TABLE 1-continued

| | Metal powder | | Binder | Organic solvent | Carbon powder | Form of composition |
|---|---|---|---|---|---|---|
| Comparative Example 8 | (M)-1 [29] | (M)-2 [17] | — | (S)-2 [50] | (C)-1 [4] | Paste |
| Comparative Example 9 | (M)-1 [34] | (M)-2 [20] | — | (S)-2 [40] | (C)-1 [6] | Kneaded material |
| Comparative Example 10 | (M)-1 [40] | (M)-2 [24] | — | (S) -2 [30] | (C)-1 [6] | Aggregated powder |
| Comparative Example 11 | (M)-1 [57] | (M)-2 [34] | — | — | (C)-1 [9] | Powder |

TABLE 2

| | Metal powder | | Binder | Organic solvent | Carbon powder | Form of composition |
|---|---|---|---|---|---|---|
| Example 1 | (M)-1 [17] | (M)-2 [10] | (B)-1 [0.35] | (S)-2 [69.65] | (C)-1 [3] | Slurry |
| Example 2 | (M)-1 [23] | (M)-2 [14] | (B)-1 [0.30] | (S)-2 [59.70] | (C)-1 [3] | Paste |
| Example 3 | (M) -1 [29] | (M)-2 [17] | (B)-1 [0.25] | (S)-2 [49.75] | (C)-1 [4] | Paste |
| Example 4 | (M)-1 [34] | (M)-2 [20] | (B)-1 [0.20] | (S)-2 [39.80] | (C)-1 [6] | Paste |
| Example 5 | (M)-1 [40] | (M)-2 [24] | (B)-1 [0.15] | (S)-2 [29.85] | (C)-1 [6] | Kneaded material |

TABLE 3

| | Metal powder | | Binder | Organic solvent | Carbon powder | Form of composition |
|---|---|---|---|---|---|---|
| Example 6 | (M)-1 [34] | (M)-2 [20] | (B)-1 [2.0] | (S)-2 [38.0] | (C)-1 [6] | Paste |
| Example 7 | (M)-1 [34] | (M)-2 [20] | (B)-1 [0.40] | (S)-2 [39.60] | (C)-1 [6] | Paste |
| Example 8 | (M)-1 [34] | (M)-2 [20] | (B)-1 [0.001] | (S)-2 [39.999] | (C)-1 [6] | Paste |
| Example 9 | (M)-1 [34] | (M)-2 [20] | (B)-1 [0.00001] | (S)-2 [39.99999] | (C)-1 [6] | Paste |

TABLE 4

| | Metal powder | | Binder | Organic solvent | Carbon powder | Form of composition |
|---|---|---|---|---|---|---|
| Example 10 | (M)-1 [17] | (M)-2 [10] | (B)-1 [1.75] | (S)-2 [68.25] | (C)-1 [3] | Paste |
| Example 11 | (M)-1 [23] | (M) -2 [14] | (B)-1 [1.5] | (S)-2 [58.5] | (C)-1 [3] | Paste |
| Example 12 | (M)-1 [29] | (M)-2 [17] | (B)-1 [1.25] | (S)-2 [48.75] | (C)-1 [4] | Paste |
| Example 13 | (M)-1 [34] | (M)-2 [20] | (B)-1 [1.0] | (S)-2 [39.0] | (C)-1 [6] | Paste |

TABLE 5

| | Metal powder | Binder | Organic solvent | Carbon powder | Form of composition |
|---|---|---|---|---|---|
| Example 14 | (M)-1 [34] | (M)-2 [20] | (B)-1 [1.0] | (S)-2 [39.0] | (C)-1 [6] | Paste |
| Example 15 | (M)-1 [34] | (M)-2 [20] | (B)-2 [1.0] | (S)-2 [39.0] | (C)-1 [6] | Paste |
| Example 16 | (M)-1 [34] | (M)-2 [20] | (B)-3 [1.0] | (S)-2 [39.0] | (C)-1 [6] | Paste |
| Example 17 | (M)-1 [34] | (M)-2 [20] | (B)-4 [1.0] | (S)-2 [39.0] | (C)-1 [6] | Paste |
| Example 18 | (M)-1 [34] | (M)-2 [20] | (B)-5 [1.0] | (S)-2 [39.0] | (C)-1 [6] | Paste |

TABLE 6

| | Metal powder | Binder | Organic solvent | Carbon powder | Form of composition |
|---|---|---|---|---|---|
| Example 19 | (M)-1 [34] | (M)-2 [20] | (B)-1 [2.0] | (S)-3 [38.0] | (C)-1 [6] | Paste |
| Example 20 | (M)-1 [34] | (M)-2 [20] | (B)-6 [1.0] | (S)-2 [39.0] | (C)-1 [6] | Paste |
| Example 21 | (M)-1 [34] | (M)-2 [20] | (B)-7 [1.0] | (S)-2 [39.0] | (C)-1 [6] | Paste |
| Example 22 | (M)-1 [34] | (M)-2 [20] | (B)-4 [5.0] | (S)-2 [35.0] | (C)-1 [6] | Paste |
| Example 23 | (M)-1 [34] | (M)-2 [20] | (B)-4 [2.0] | (S)-2 [38.0] | (C)-1 [6] | Paste |
| Example 24 | (M)-1 [34] | (M)-2 [20] | (B)-4 [0.5] | (S)-2 [39.5] | (C)-1 [6] | Paste |

In Tables 1 to 6, each abbreviation has the following meaning. Each numerical value in the parentheses is the content (ratio (% by mass) with respect to the total amount (100% by mass) of the composition) in the composition.

(M)-1: Aluminum powder, volume average particle diameter of 40 μm
(M)-2: Titanium powder, volume average particle diameter of 45 μm
(B)-1: Hydroxypropyl cellulose (HPC-M), Mw of 620000
(B)-2: Hydroxypropyl cellulose (HPC-L), Mw of 140000
(B)-3: Polyacrylic acid
(B)-4: Polyvinyl butyral, Mw of 38000
(B)-5: Bentonite
(B)-6: Polyvinyl butyral, Mw of 60000
(B)-7: Polyvinyl butyral, Mw of 14000
(S)-1: Glycerin
(S)-2: Ethanol
(S)-3: Propylene glycol monomethyl ether
(C)-1: Carbon powder, volume average particle diameter of 40 nm <Evaluation>

A metal/resin bonded member was produced using the metal base material and the resin member described below.

Metal base material: A5052 aluminum plate having length of 5 cm, width of 2 cm, and thickness of 1 mm
Resin member: sheet made of nylon 66 having length of 5 cm, width of 2 cm, and thickness of 1 mm

[Test of Forming Beads (Protrusions of Alloy) on Surface of Metal Base Material]

Step (i):

The aluminum plate serving as the metal base material was coated with each of the compositions for claddings of Example 4, Comparative Example 4, Comparative Example 9, and Comparative Example 11 in a pattern with a thickness of 100 μm, a width of 1.2 mm, and a length of 1.5 cm.

Step (ii):

Next, the coated portion of the aluminum plate which had been coated with the cladding composition was irradiated with a laser so that beads (protrusions of an alloy) on the surface of the aluminum plate.

In the present example, a semiconductor laser having a wavelength of 970 nm, which was shaped into a spot beam having a diameter of 1.2 mm using an optical system, was used. The scanning speed of the spot beam was set to 20 mm/s. The spot beam was used to scan over a width of 16 mm, and a region with an area of 20 mm² or greater was irradiated with the beam.

FIGS. 1 to 4 show the states of the beads formed using each of the compositions for claddings of Example 4, Comparative Example 4, Comparative Example 9, and Comparative Example 11.

FIG. 1 is an optical microscope image (at a magnification of 5 times) showing the state of the beads formed using the cladding composition of Example 4.

Figure 2:
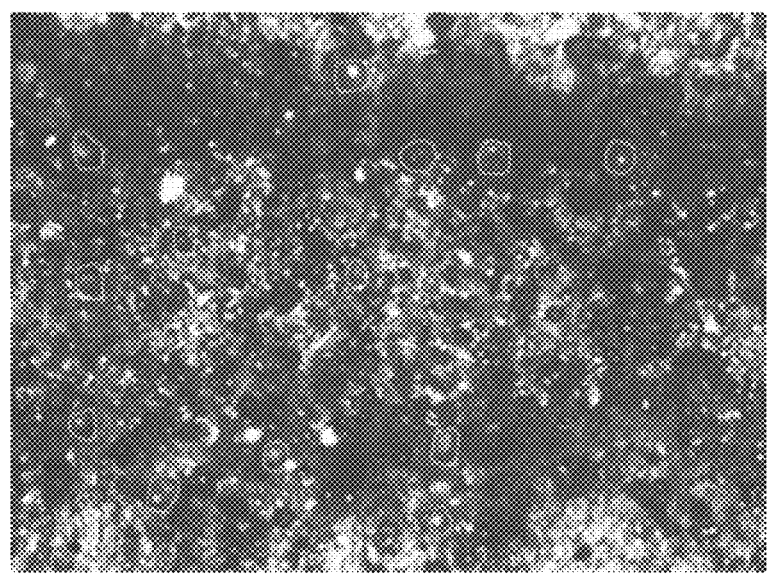
FIG. 2 is an optical microscope image (at a magnification of 5 times) showing a state of beads formed using a cladding composition of Comparative Example 4.

FIG. 2 is an optical microscope image (at a magnification of 5 times) showing the state of the beads formed using the cladding composition of Comparative Example 4.

Figure 3:
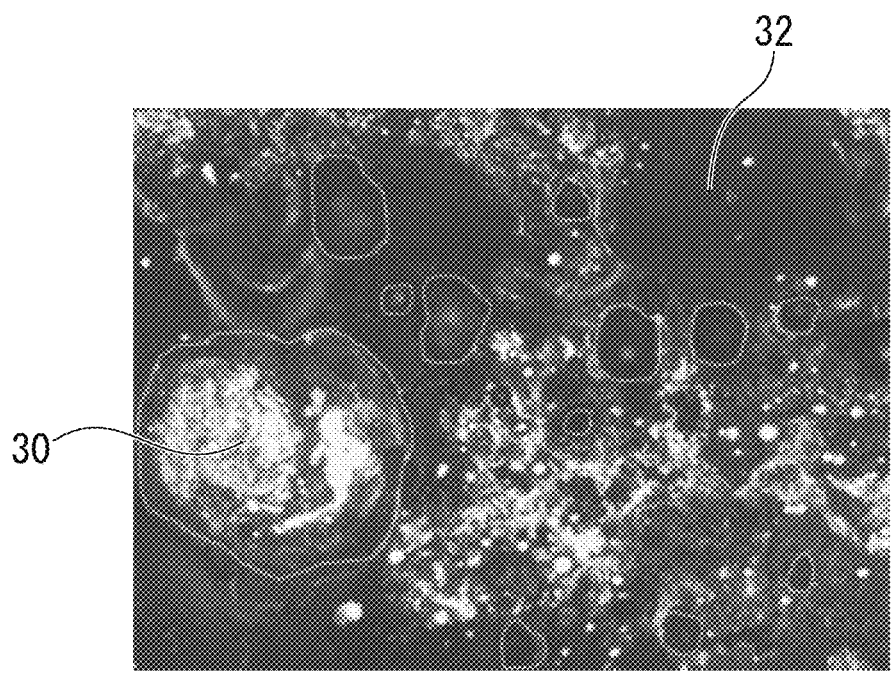
FIG. 3 is an optical microscope image (at a magnification of 5 times) showing a state of beads formed using a cladding composition of Comparative Example 9.

FIG. 3 is an optical microscope image (at a magnification of 5 times) showing the state of the beads formed using the cladding composition of Comparative Example 9.

Figure 4:
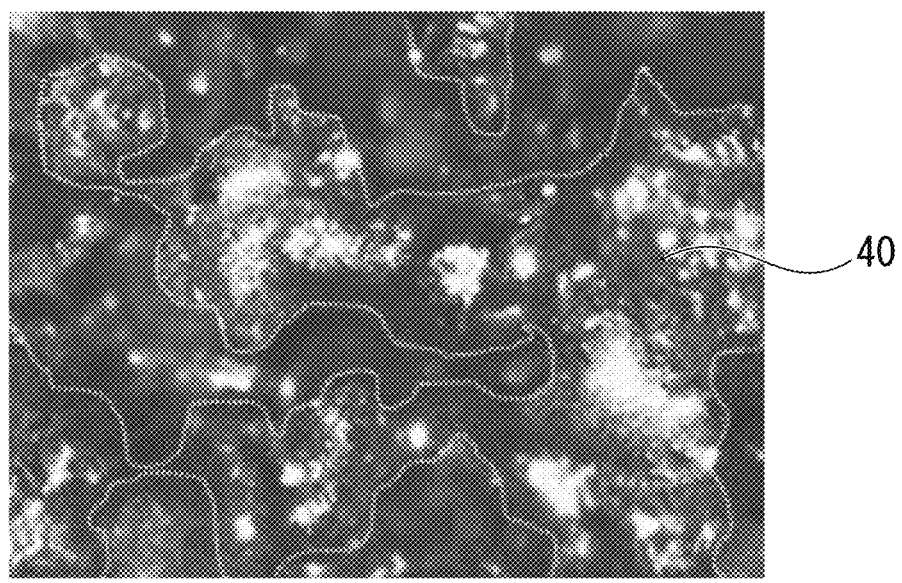
FIG. 4 is an optical microscope image (at a magnification of 5 times) showing a state of beads formed using a cladding composition of Comparative Example 11.

FIG. 4 is an optical microscope image (at a magnification of 5 times) showing the state of the beads formed using the cladding composition of Comparative Example 11.

In FIG. 1, in a case where the beads were formed using the cladding composition of Example 4, it can be confirmed that the melted solidified material of the mixed powder of the metal powder and the carbon powder was densely formed and thus protrusions 10 were formed. Further, voids 12 were present between the protrusions 10, and significant unevenness formed of the voids 12 and the protrusions 10 was uniformly shown on the entire surface of the metal base material.

In FIG. 2, in a case where the beads were formed using the cladding composition of Comparative Example 4, very few protrusions in which the melted solidified material of the mixed powder of the metal powder and the carbon powder was densely formed were found, and unevenness formed of protrusions and voids was not found.

In FIG. 3, in a case where the beads were formed using the cladding composition of Comparative Example 9, only a few protrusions 30 in which the melted solidified material of the mixed powder of the metal powder and the carbon powder was densely formed were found, and unevenness formed of the protrusions 30 and voids 32 was unlikely to be found.

In FIG. 4, in a case where the beads were formed using the cladding composition of Comparative Example 11, large protrusions 40 in which the melted solidified material of the mixed powder of the metal powder and the carbon powder was more densely formed were formed, compared to a case where the beads were formed using the cladding composition of Example 4. The protrusions 40 were unevenly present on the surface of the metal base material.

[Evaluation of Bonding Strength]

Step (i):

The aluminum plate serving as the metal base material was coated with each of the compositions for claddings of Examples 6 to 17, Examples 19 to 24, and Comparative Example 11 in a pattern with a thickness of 100 μm, a width of 2 mm, and a length of 1.5 cm.

Step (ii):

Next, the coated portion of the aluminum plate which had been coated with the cladding composition was irradiated with a laser so that beads (protrusions of an alloy) on the surface of the aluminum plate.

Here, a semiconductor laser having a wavelength of 970 nm, which was shaped into a spot beam having a diameter of 2 mm using an optical system, was used for the irradiation with a laser. The scanning speed of the spot beam was set to 30 mm/s. The spot beam was used to scan over a width of 20 mm, and a region with an area of 40 $mm^2$ or greater was irradiated with the beam.

Step (iii):

Next, a sheet made of nylon 6,6 serving as the resin member was disposed on the beads formed on the surface of the aluminum plate and pressed against the beads. The pressing of the sheet was backed by a metal backing plate from a side of the metal base material, the resin member was interposed between glass plates (TEMPAX, thickness of 5 mm), and a pressure of 1.4 MPa was applied on the display using a hydraulic pump.

Step (iv):

Next, the interface between the bead formed on the surface of the aluminum plate and the sheet made of nylon 6,6 was irradiated with the laser spot of the semiconductor laser shaped into a spot beam from a side of the resin member so that the interface was heated, thereby obtaining a bonded member of the aluminum plate and the sheet made of nylon 6,6.

The irradiation with the laser spot here was performed under conditions of an average output of 150 W, a repetition frequency of 1000 Hz, a duty of 50%, and a scanning speed of 10 mm/s.

The bonding strength of the obtained bonding member of the aluminum plate and the sheet made of nylon 6,6 was measured by performing a shear tensile strength test. The results are listed in Tables 7 and 8.

TABLE 7

|   | Bonding strength (MPa) |
|---|---|
| Example 6 | 43.8 |
| Example 7 | 46.7 |
| Example 8 | 43.0 |
| Example 9 | 44.5 |
| Example 10 | 36.0 |
| Example 11 | 36.0 |
| Example 12 | 38.0 |
| Example 13 | 40.0 |
| Example 14 | 40.0 |
| Example 15 | 36.0 |
| Example 16 | 39.0 |
| Comparative Example 11 | 34.0 |

TABLE 8

|   | Bonding strength (MPa) |
|---|---|
| Example 6 | 43.8 |
| Example 19 | 46.7 |
| Example 17 | 35.9 |
| Example 20 | 41.6 |
| Example 21 | 34.5 |
| Example 22 | 41.8 |

TABLE 8-continued

|   | Bonding strength (MPa) |
|---|---|
| Example 23 | 35.4 |
| Example 24 | 36.2 |

As shown in the results listed in Tables 7 and 8, it was confirmed that a metal/resin bonded member in which the bonding strength between the metal base material and the resin member was further increased was able to be produced without using an adhesive by applying the present invention.

Example 6 and Example 19 are different from each other in terms of the organic solvent. It was confirmed that the bonding strength in a case of using the cladding composition of Example 19 was slightly higher than that in a case of using the cladding composition of Example 6.

Example 17, Example 20, and Example 21 are different from each other in terms of the Mw of polyvinyl butyral used as the binder. It was confirmed that the bonding strength tends to be higher as the Mw of polyvinyl butyral increases.

According to the cladding composition of the present invention, the bonding strength can be further increased, and the metal base material and the resin member can be stably bonded to each other.

REFERENCE SIGNS LIST 10 protrusion
12 void
30 protrusion
32 void
40 protrusion

The invention claimed is:

1. A laser cladding composition comprising:
  a metal powder;
  a binder;
  a carbon powder; and
  an organic solvent,
  wherein a content of the metal powder is in a range of 25% to 70% by mass with respect to a total amount of the composition, and
  the metal powder includes two or more different metal powders.

2. The laser cladding composition according to claim 1, wherein the metal powder is dispersed in a mixed solution of the binder and the organic solvent.

3. The laser cladding composition according to claim 1, wherein a content of the binder is in a range of 0.000001% to 10% by mass with respect to a total amount of the composition.

4. The laser cladding composition according to claim 1, wherein the binder contains a cellulose compound.

5. The laser cladding composition according to claim 1, wherein the organic solvent contains an alcohol.

6. A laser cladding composition comprising:
  a metal powder;
  a binder;
  a carbon powder; and
  an organic solvent,
  wherein a content of the metal powder is in a range of 25% to 70% by mass with respect to a total amount of the composition, and
  the metal powder contains titanium.

7. The laser cladding composition according to claim 1, wherein a metal constituting the metal powder includes at least one selected from a group consisting of aluminum, nickel, chromium, iron, copper, titanium, silicon, stellite, vanadium, and alloys thereof.

8. The laser cladding composition according to claim 1, wherein the metal powder includes titanium powder and aluminum powder.

9. The laser cladding composition according to claim 1, wherein a content of the carbon powder is in a range of 0.1% to 15% by mass with respect to a total amount of the cladding composition.

10. The laser cladding composition according to claim 1, wherein a mixing ratio of the metal powder to the carbon powder, which is a mass ratio thereof, of the cladding composition is in a range of 3 to 30.

11. The laser cladding composition according to claim 1, wherein an average particle diameter of the carbon powder is in a range of 10 nm to 100 μm.

12. The laser cladding composition according to claim 1, wherein the binder includes at least one selected from the group consisting of hydroxypropyl cellulose and hydroxyethyl cellulose.

* * * * *